(12) United States Patent
Kolesnikov

(10) Patent No.: US 7,765,188 B2
(45) Date of Patent: Jul. 27, 2010

(54) TAXONOMY EDITOR

(75) Inventor: Pavel Kolesnikov, Prague (CZ)

(73) Assignee: Hewlett-Packard Develoment Company, L.P., Houston, TX (US)

( * ) Notice: Subject to any disclaimer, the term of this patent is extended or adjusted under 35 U.S.C. 154(b) by 546 days.

(21) Appl. No.: 11/808,319

(22) Filed: Jun. 8, 2007

(65) Prior Publication Data
US 2008/0306947 A1    Dec. 11, 2008

(51) Int. Cl.
*G06F 7/00*    (2006.01)
(52) U.S. Cl. .................. 707/625; 707/803; 707/812; 707/802
(58) Field of Classification Search .............. 707/100, 707/104.1, 101, 802, 803, 610, 625
See application file for complete search history.

(56) References Cited

U.S. PATENT DOCUMENTS

2006/0004815 A1*  1/2006  Murata et al. ............... 707/101
2008/0059841 A1*  3/2008  Bordawekar et al. .......... 714/38

* cited by examiner

*Primary Examiner*—Don Wong
*Assistant Examiner*—Angela M Lie

(57) ABSTRACT

A repository 10 stores metadata, including at least one taxonomy definition 16 and records 14, which may be classified using the defined taxonomies. An editor 20 may be used to edit taxonomy definitions, using a local copy 22. To check the edit, a taxonomy search service in repository 10 may be called to check for consistency, whether or not the data in the repository 10 exposed on repository interface 18.

12 Claims, 2 Drawing Sheets

TAXONOMY EDITOR

BACKGROUND OF THE INVENTION

There has been considerable interest in recent times in the provision of web services, i.e. the provision of services on the internet that do not simply provide web pages for display to human users.

One approach that has been adopted is a registry for defining aspects of web-available services. For example, the universal description discovery and integration (UDDI) standard defines an extended markup language (XML) based registry that allows services to be published with details about the service provided. Such registries can be interrogated for further information which may, for example, include web service description language (WDSL) documents defining web services, including protocol bindings and message formats. The registry will normally be interrogated by messages in a standard format, such as the SOAP format, or other suitable formats.

Many other types of information may also be included in a database, also known as a repository.

In order to classify the information, various classification schemes, known as taxonomies, can be adopted. For example, Dun and Bradsheet have defined numbers in the data universal numbering system (D-U-N-S). Each business that has applied for such a number has a single unique number assigned to it. Another taxonomy is the ISO 3166 Geographic taxonomy which assigns a number representing a geographic location. Further examples include taxonomies that assign numbers to different types of business service, so one number indicates a supplier of courier services and another number indicates a supplier of photocopying services.

In general, a single entry may include a number of such codes, in a number of taxonomies. For example, an entry may include the D-U-N-S number to identify the service provider, an ISO 3166 code to indicate the geographic location, and other numbers indicating the service provided. The provision of multiple codes allows the search for a number of different aspects of the data entry provided, for example it allows a user to search for a particular geographic location.

The definitions of a taxonomy may change over time. New codes may be introduced for new categories, former codes merged or deleted, and the definitions of specific codes may change.

There is accordingly a need to ensure that changes can be made.

BRIEF DESCRIPTION OF THE DRAWINGS

An embodiment will now be described, purely by way of example, with reference to the accompanying drawings, in which.

DETAILED DESCRIPTION

Figure 1:
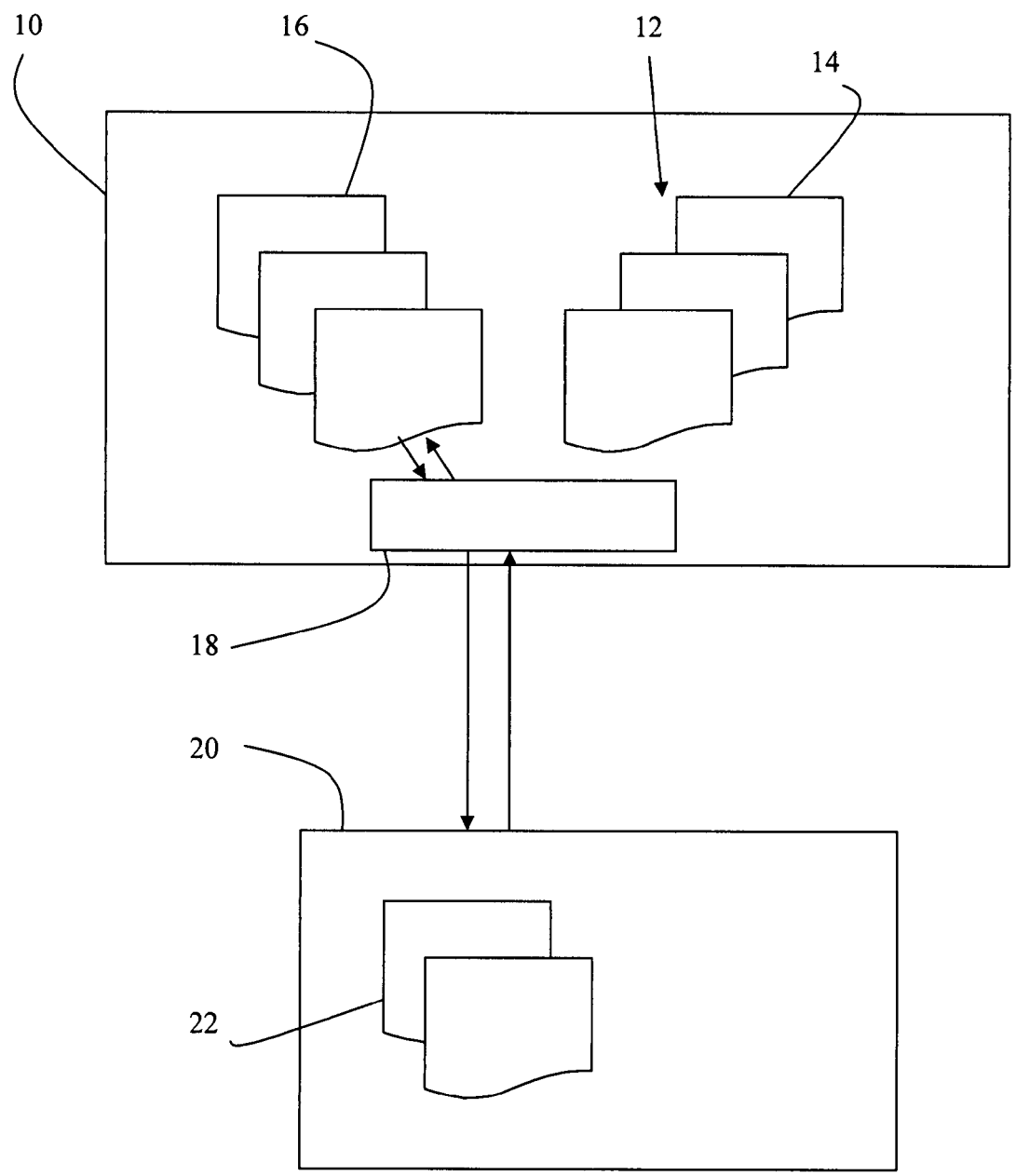
FIG. 1 illustrates a metadata repository according to an embodiment.

FIG. 1 shows schematically a metadata repository 10 which contains metadata 12, including a plurality of artifacts 14, i.e. data objects. The repository 10 also includes definitions of one or more taxonomies 16, each taxonomy being a classification system used to index the metadata. The repository communicates through a UDDI interface 18. In the example, repository 10 is a stateless repository, in particular a "REST" repository that is stateless and returns data in one or more predetermined formats through an interface 18.

The metadata repository 10 is in communication with a taxonomy editor 20 which in the example is an application running on a separate client workstation. The taxonomy editor retrieves one or more taxonomies 16 from the repository 10, creating a local copy 22 of the one or more taxonomies, edits the local copy 22 and returns the edited local copy 22 to the repository 10 to update the taxonomies 16 there.

Each taxonomy 16 is referenced with a taxonomy ID.

The resources 14 are, in this example, resources having a categoryBag definition which includes entries based on the taxonomies 16. In the particular example, these entries are keyValue entries.

For example, the UDDI specification defines categoryBag elements which may include one or more keyedReference elements. Each keyedReference element includes three items: keyvalue, keyName and tModelKey. The first is the value of the code, i.e. the value that is searched. The keyName is a convenient human-readable label. The tModelKey defines the classification scheme, generally by using a universally unique identifier (uuid). Thus, a categoryBag element including both the D-U-N-S number and the ISO 3166 geographic code will have a first keyedReference element including the D-U-N-S number as the keyValue and the tModelKey as a uuid for the D-U-N-S taxonomy, and a second keyedReference element including the ISO 3166 geographic code as the keyvalue, a human readable element such as "US-CA" for the keyName, and a uuid for the ISO 3166 geographic code as the tModelKey.

In general, there may be many more than two keyedReference elements in the categoryBag of a record.

Consider as an example the taxonomy "failure impact", a very simple taxonomy that includes values such as "low", "medium" and "high", reflecting the impact of a particular failure on a business.

Another abstract taxonomy "Business service" may include a property "failure impact" that is defined to have values from the "Failure impact" taxonomy. Thus, a taxonomy is effectively used as a data type. Any change to the definition of the "Failure impact" taxonomy can thus affect the "business service" taxonomy. The abstract taxonomy "Business type" is in the example not intended for use itself but as the basis for further taxonomies that are defined by inheritance based on "Business type".

The properties of the artifact are represented in XML in the example. As an example, consider a business service artifact, defined as follows:

```
<?XML version="1.0" encoding="UTF-8"?>
<a:businessServiceArtifact deleted="0"
xlink:href="businessServiceArtifacts/2.XML"
<g:nameGroup>
  <p:name XML:lang="en">My First Servce</p:name>
</g:nameGroup>
<g:descriptionGroup>
  <p:description XML:lang="en">description</p:description>
</g:descriptionGroup>
  <p:criticality name="Low"
taxonomyUri="uddi:systinet.com:soa:model:taxonomies:impactLevel"
value="uddi:systinet.com:soa:model:taxonomies:impactLevel:low"/>
  <p:categoryBag
  <pt:category name="Agriculture, Forestry, and Fishing"
taxonomyUri="uddi:70a80f61-77bc-4821-a5e2-2a406acc35dd"
value="0"/>
  <pt:category name="Change management"
taxonomyUri="uddi:systinet.com:soa:model:taxonomies:reportCategories"
value="uddi:systinet.com:soa:model:taxonomies:reportCategories:change-
```

-continued

```
Management"/>
    </p:categoryBag>
    <p:importedIMPDocument deleted="0"
xlink:href="XMLSchemas/Book2.imp?revision=0" />
    <p:revision>2</p:revision>
</a:businessServiceArtifact>
```

The artifact is defined to have a number of properties which are specified by XML statements in the form <p:name_of_property data/> or <p:name_of_property> data </p:name_of_property>, where the property name is name_of_property. Thus, in the example, the "revision" property has the (numeric) data "2". This indicates the second revision of the artifact.

A further example is the property "criticality name", which in the example takes the value "Low". This value is taken from a taxonomy defined at a uri uddi:systinet.com:soa:model:taxonomies:impactLevel and having a value defined at the url uddi:systinet.com:soa:model:taxonomies:impactLevel:low. Thus, it will be seen in this example that the property is effectively typed, that is to say it can have only predetermined values defined in the taxonomy definition file explicitly referenced in the instance of the artifact.

The example also has a "categoryBag" property that may be used to store a number of different types of taxonomy information, i.e. untyped or free-format data. In he example, the artifact has a defined category value of "Agriculture Forestry and Fishing", from the taxonomy defined at uddi:70a80f61-77bc-4821-a5e2-2a406acc35dd", which defines a particular business service area, and a further category value of "change management" from the taxonomy defined at uddi:systinet.com. In particular, the artifact may have properties defined to store data.

Thus, when creating an instance of the business services artifact, any property from any taxonomy may be used to classify the instance, even if this was not foreseen when designing the artifact.

When a taxonomy is updated, this can create a number of difficulties. Firstly, there may be resources 14 stored in the repository 10 that are classified using either a complete taxonomy that no longer exists, or codes defined in an earlier version of the taxonomy that no longer exist in the updated version.

Accordingly, the metadata repository exposes a number of routines on the UDDI interface, which are called by the taxonomy editor 20 to carry out a check. The check is accordingly carried out through cooperation between the repository and editor.

Figure 2:
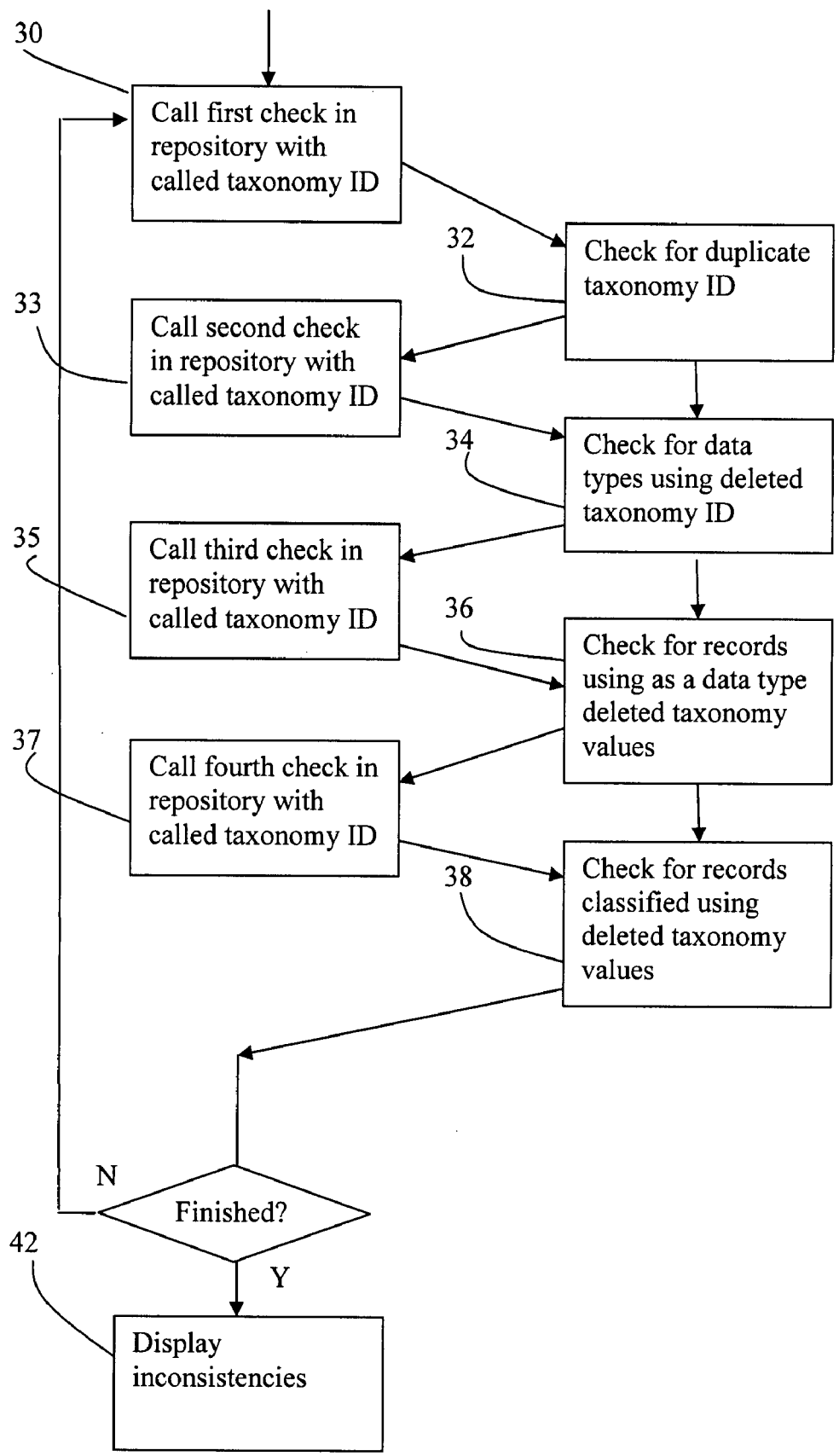
FIG. 2 is a flow chart illustrating a method according to an embodiment.

In more detail, the check carries out the following steps as illustrated in FIG. 2. Note that the steps in the taxonomy editor 20 are on the left side of FIG. 2 and the steps carried out in the repository are on the right side.

For each taxonomy indicated in the editor as being required to be checked, including deleted taxonomies, the taxonomy editor 20 calls 30 the repository 10 to execute a specific routine check on that taxonomy. The taxonomy editor then calls 33, 35, 37 three further check routines in turn to check different aspects.

The first check 32 is simply to find any other taxonomy with the same ID as the checked taxonomy, that is to check for duplicate taxonomies.

The second check 34 is to find inconsistencies between the model definition of the checked taxonomy and other taxonomies, that is to say to find and return any data type that refers to a taxonomy that has been deleted, or values of a taxonomy that has been deleted.

The third check 36 is to find records using a checked taxonomy or an entry in the checked taxonomy that is no longer present. In the example of a deleted "Failure impact" taxonomy, the third check will return any records using this as a data type when called using the "Failure impact" taxonomy as the checked taxonomy, such as the "Business Method" artifact defined above.

The fourth check 38 is to check the values in categoryBag records against the checked taxonomy, and returning the records including any values that do not appear in the current version of the checked taxonomy. Thus, if the "Failure Impact" taxonomy is edited so that it no longer includes the value "low", the instance of the "Business Method" artifact defined above, that uses this value "low", will be returned.

The third and fourth checks together thus return all records that are no longer compatible with the checked taxonomy. In alternative implementations, these two checks could be run with a single query.

Each of the checks in turn are then repeated for each taxonomy to be checked until all taxonomies have been checked. Inconsistencies are then displayed 42.

In this way, the taxonomy check an be carried out even if the repository is a stateless repository such as a REST repository, and in particular in spite of the lack of a record kept in the repository of the state of the taxonomy editor.

Conveniently, the check can be carried out for all taxonomies amended in the editor, or for all taxonomies.

The check then returns a screen with a tree structure indicating any difficulties on the client 10 which may be used to correct any problems. The screen displays any taxonomies that have been returned in the first and second checks and artifacts in taxonomies that have been returned in the third and fourth checks.

Although in the simple example given it would be relatively straightforward to carry out the checks manually, taxonomy systems and resources can get very complicated and where there is a lot of inheritance it can be essentially impossible to check manually all possibilities. The example illustrates a convenient and reliable way of carrying out the check.

Of course, those skilled in the art will realise that many changes may be made to the example above, as required. For example, the repository and editor can be provided on a single computer system, or a networked system, and the various data storage devices can again be local or networked as required.

The invention claimed is:

1. A method of operating a repository, comprising:
   storing at least one taxonomy definition defining a taxonomy and a plurality of taxonomy values in the repository;
   storing records having associated taxonomy values in the repository;
   editing the taxonomy definition of at least one taxonomy in a taxonomy editor;
   sending a message from the taxonomy editor to an interface of the repository for at least one candidate taxonomy to cause a repository service to search the repository for inconsistency between the at least one candidate taxonomy and the data stored in the repository, the message indicating the candidate taxonomy; and
   sending a reply message from the interface of the metadata repository, the reply message indicative of the inconsistency found between the at least one candidate taxonomy and the data stored in the repository.

2. A method according to claim 1, wherein the interface of the metadata repository exposes at least one check routine, the method including calling the or each check routine to cause the repository service to check for a specific inconsistency between the at least one candidate taxonomy and the data stored in the repository.

3. A method according to claim 2 comprising calling a deleted taxonomy check routine to check for any records using as a data type any deleted taxonomy or using as a data value a deleted value from the at least one candidate taxonomy.

4. A method according to claim 2 comprising calling a deleted data values check routine to check for any records using data including data values deleted from the at least one candidate taxonomy.

5. A method according to claim 2 comprising calling a duplicate taxonomy check routine to check for any data types defined using any deleted taxonomies or deleted taxonomy values from the at least one candidate taxonomy.

6. A method according to claim 2 comprising calling a deleted taxonomy check routine to check for any duplicated taxonomy identifiers with the at least one candidate taxonomy.

7. A method according to claim 1 wherein each taxonomy has a taxonomy identifier, and the method comprises:

calling the repository service to check for any duplicated taxonomy identifiers with the at least one candidate taxonomy;

calling the repository service to check for any data types defined using any deleted taxonomies or taxonomy values from the at least one candidate taxonomy;

calling the repository service to check for any records using as a data type any deleted taxonomies from the at least one candidate taxonomy; and calling the repository service to check for any records using data values deleted from any of the at least one candidate taxonomy.

8. A repository system, including:

a metadata repository storing metadata including records defining taxonomies and records using the taxonomies to define taxonomy values, the metadata repository having a service interface exposing a data update service for updating the data in records and also exposing a taxonomy search service; and a taxonomy editor arranged as a client of the metadata repository, arranged to call the data update service to edit the definitions of taxonomies and to edit the taxonomy values stored in records;

wherein the taxonomy editor is arranged to send a message to the taxonomy search service for at least one called taxonomy to cause the taxonomy search service to search the metadata repository for inconsistency between the at least one called taxonomy and the metadata stored in the repository, the message indicating the at least one called taxonomy;

wherein the taxonomy search service is arranged to send a reply message, the reply message indicative of the inconsistency between the at least one called taxonomy and the metadata stored in the repository.

9. A repository system according to claim 8 wherein the taxonomy search service is arranged to return the identity of records having a data type incompatible with the at least one called taxonomy.

10. A repository system according to claim 8 wherein the taxonomy search service is arranged to return the identity of records having a data value incompatible with the at least one called taxonomy.

11. A repository system according to claim 8 wherein the taxonomy search service is arranged to return any data type defined using the at least one called taxonomy or values from the at least one called taxonomy that are no longer available.

12. A repository system according to claim 8 wherein each taxonomy has an identity number; and the taxonomy search service is arranged to return any taxonomy having a duplicate identity number to the at least one called taxonomy.

* * * * *

UNITED STATES PATENT AND TRADEMARK OFFICE
CERTIFICATE OF CORRECTION

PATENT NO. : 7,765,188 B2  Page 1 of 1
APPLICATION NO. : 11/808319
DATED : July 27, 2010
INVENTOR(S) : Pavel Kolesnikov It is certified that error appears in the above-identified patent and that said Letters Patent is hereby corrected as shown below:

On Title page, in Item (73), Assignee, in column 1, line 1, delete "Develoment" and insert -- Development --, therefor.

Signed and Sealed this

Sixteenth Day of November, 2010

David J. Kappos
*Director of the United States Patent and Trademark Office*